US012117136B1

(12) United States Patent
Kosugi

(10) Patent No.: US 12,117,136 B1
(45) Date of Patent: Oct. 15, 2024

(54) VEHICLE LIGHTING DEVICE AND VEHICLE LAMP

(71) Applicant: Toshiba Lighting & Technology Corporation, Kanagawa (JP)

(72) Inventor: Daisuke Kosugi, Ehime-ken (JP)

(73) Assignee: Toshiba Lighting & Technology Corporation, Kanagawa (JP)

( * ) Notice: Subject to any disclaimer, the term of this patent is extended or adjusted under 35 U.S.C. 154(b) by 0 days.

(21) Appl. No.: 18/599,081

(22) Filed: Mar. 7, 2024

(30) Foreign Application Priority Data

Jun. 30, 2023 (JP) ................................ 2023-107688
Jan. 12, 2024 (JP) ................................ 2024-003417

(51) Int. Cl.
*F21S 41/19* (2018.01)
*F21S 41/143* (2018.01)
*H05B 47/105* (2020.01)

(52) U.S. Cl.
CPC ........... *F21S 41/192* (2018.01); *F21S 41/143* (2018.01); *H05B 47/105* (2020.01)

(58) Field of Classification Search
CPC ...... F21S 41/14–143; F21S 41/19–192; H05B 47/10–11
See application file for complete search history.

(56) References Cited

U.S. PATENT DOCUMENTS 5,939,839 A 8/1999 Robel et al.
2021/0153314 A1 5/2021 Ichikawa et al.

FOREIGN PATENT DOCUMENTS

JP 7018124 2/2022

*Primary Examiner* — Jason M Han
(74) *Attorney, Agent, or Firm* — JCIPRNET

(57) ABSTRACT

A vehicle lighting device includes: a socket; a substrate provided on one end side of the socket; a light-emitting element provided on the substrate; a control element provided on the substrate and including a current driver whose output side is electrically connected to the light-emitting element and a current setting circuit whose output side is electrically connected to the current driver; a first circuit provided on the substrate, electrically connected to a first input side of the current setting circuit, and whose resistance value changes depending on an ambient temperature of the light-emitting element; and a second circuit provided on the substrate, electrically connected to a second input side of the current setting circuit, and whose resistance value changes depending on the ambient temperature of the light-emitting element. Amount or ratio of output current flowing to the light-emitting element is changed according to an ambient temperature of the light-emitting element.

10 Claims, 9 Drawing Sheets

VEHICLE LIGHTING DEVICE AND VEHICLE LAMP

CROSS-REFERENCE TO RELATED APPLICATION

This application claims the priority benefits of Japanese application no. 2023-107688, filed on Jun. 30, 2023 and Japanese application no. 2024-003417, filed on Jan. 12, 2024. The entirety of the above-mentioned patent application is hereby incorporated by reference herein and made a part of this specification.

BACKGROUND

Technical Field

Embodiments of the disclosure relate to a vehicle lighting device and a vehicle lamp.

Related Art

From the viewpoints of energy saving and longevity, vehicle lighting devices equipped with light-emitting elements such as light-emitting diodes are becoming more and more popular, instead of vehicle lighting devices equipped with lamps having filaments. A vehicle lighting device equipped with a light-emitting element has, for example, a substrate on which a light-emitting element and a circuit element are mounted.

Here, when current flows in the light-emitting element, light is irradiated from the light-emitting element and heat is generated in the light-emitting element and the circuit element. Further, in a case of a vehicle lighting device, temperature of atmosphere in which the vehicle lighting device is provided may be about 85° C. Thus, the temperature of the light-emitting element may become too high and exceed a maximum junction temperature. If the temperature of the light-emitting element exceeds the maximum junction temperature, there is a risk that the light-emitting element will malfunction or the function of the light-emitting element may deteriorate.

Thus, a vehicle lighting device including a control element that controls the current flowing in the light-emitting element according to an ambient temperature of the light-emitting element has been proposed. That is, a vehicle lighting device including a control element that performs temperature derating has been proposed. Such a control element decreases a total luminous flux of light irradiated from the light-emitting element based on the ambient temperature of the light-emitting element in a region where the ambient temperature of the light-emitting element is high.

However, depending on the type, application or the like of the vehicle lighting device, the total luminous flux for a predetermined temperature may differ from the total luminous flux specified by temperature derating.

Thus, it has been desired to develop a technique that may change a ratio of decreasing the total luminous flux in a region where the ambient temperature of the light-emitting element is high.

CITATION LIST

Patent Literature

[Patent Literature 1] JP 7018124

The disclosure provides a vehicle lighting device and a vehicle lamp capable of changing a ratio of decreasing the total luminous flux in a region where the ambient temperature of the light-emitting element is high.

SUMMARY

A vehicle lighting device according to an embodiment includes a socket; a substrate provided on one end side of the socket; a light-emitting element provided on the substrate; a control element provided on the substrate and including a current driver whose output side is electrically connected to the light-emitting element and a current setting circuit whose output side is electrically connected to the current driver; a first circuit provided on the substrate, electrically connected to a first input side of the current setting circuit, and whose resistance value changes depending on an ambient temperature of the light-emitting element; a second circuit provided on the substrate, electrically connected to a second input side of the current setting circuit, and whose resistance value changes depending on the ambient temperature of the light-emitting element. In a temperature region where the ambient temperature of the light-emitting element exceeds a first temperature and is equal to or lower than a second temperature higher than the first temperature, the current setting circuit decreases an output current flowing to the light-emitting element as the ambient temperature of the light-emitting element rises, based on changes in the resistance value of the first circuit. In a temperature region where the ambient temperature of the light-emitting element exceeds the second temperature, the current setting circuit increases a ratio of decreasing the output current flowing to the light-emitting element as the ambient temperature of the light-emitting element rises, based on changes in the resistance value of the second circuit.

DESCRIPTION OF THE EMBODIMENTS

Figure 1:
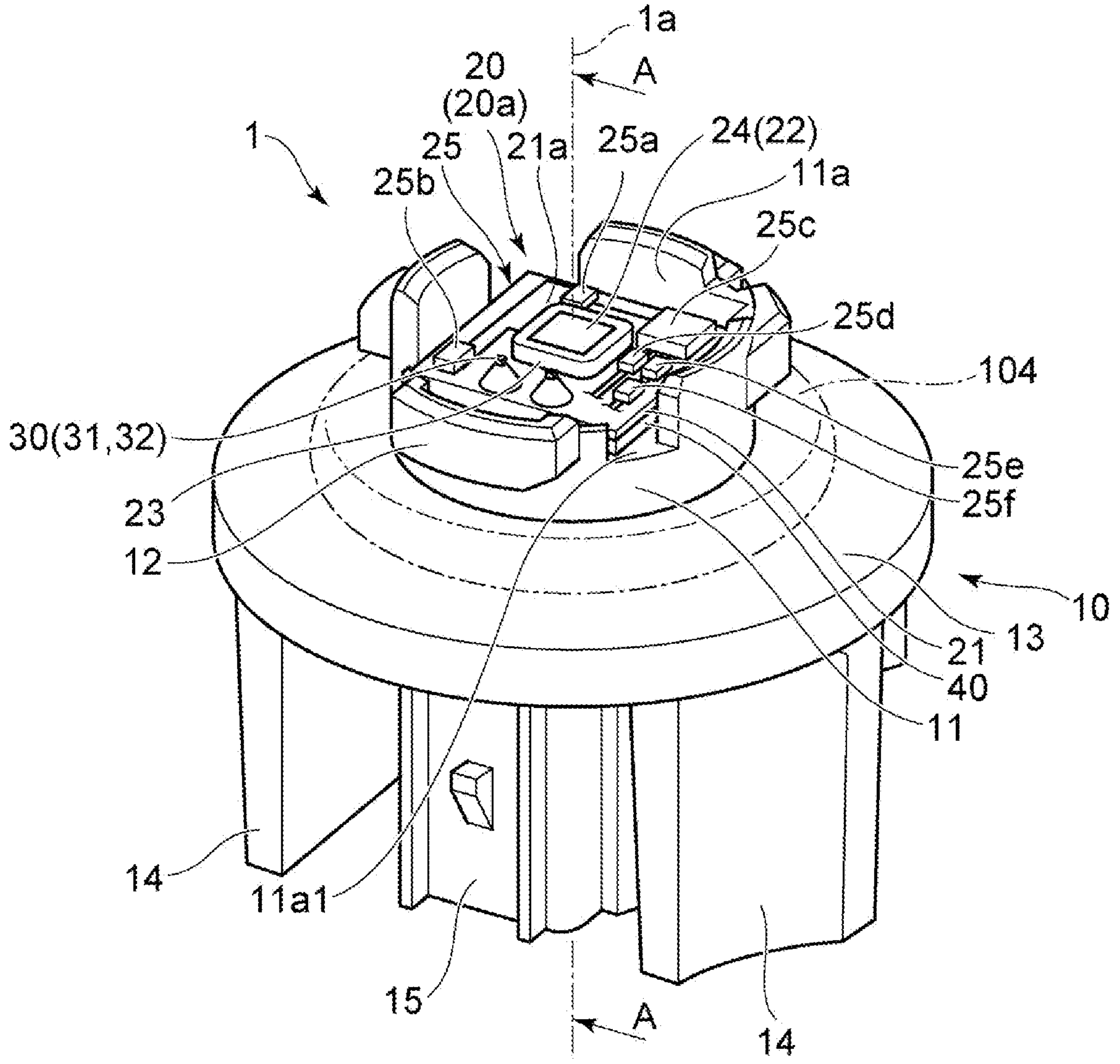
FIG. 1 is a schematic perspective diagram for illustrating a vehicle lighting device according to an embodiment.

According to embodiments of the disclosure, it is possible to provide a vehicle lighting device and a vehicle lamp capable of changing a ratio of decreasing the total luminous flux in a region where the ambient temperature of the light-emitting element is high.

Hereinafter, embodiments will be illustrated with reference to the drawings. Moreover, in each drawing, similar components are denoted by the same reference numerals, and detailed explanations are omitted as appropriate.

(Vehicle Lighting Device)

A vehicle lighting device 1 according to the embodiment may be installed in, for example, an automobile or a railway vehicle. Examples of the vehicle lighting device 1 provided in an automobile those used for a front combination light (for example, an appropriate combination of Daytime Running Lamp (DRL), position lamp, turn signal lamp, etc.) or a rear combination light (for example, an appropriate of stop lamp, tail lamp, turn signal lamp, back lamp, fog lamp, etc.). However, the uses of the vehicle lighting device 1 are not limited thereto.

FIG. 1 is a schematic perspective diagram for illustrating the vehicle lighting device 1 according to the embodiment.

Figure 2:
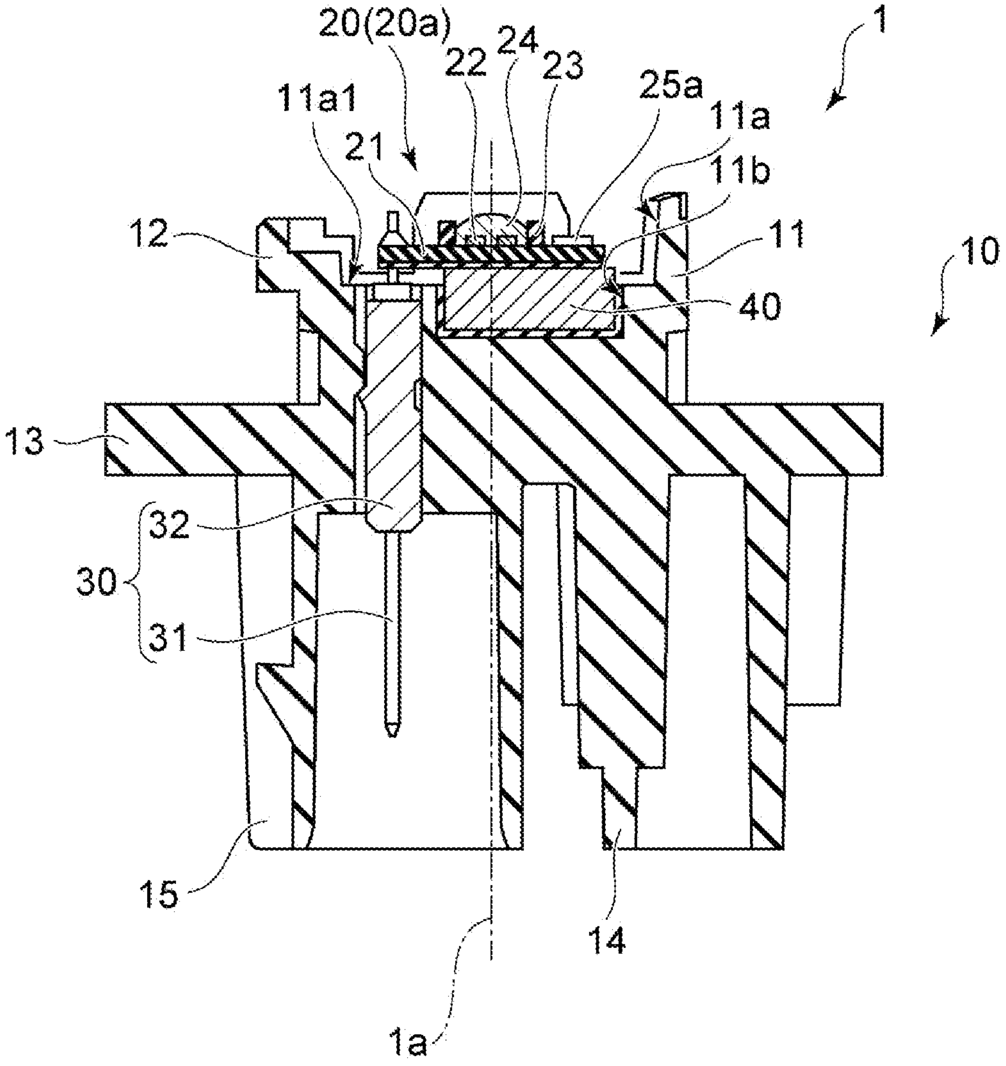
FIG. 2 is a cross-sectional diagram taken along line A-A of the vehicle lighting device in FIG. 1.

FIG. 2 is a cross-sectional diagram taken along line A-A of the vehicle lighting device 1 in FIG. 1.

As shown in FIGS. 1 and 2, the vehicle lighting device 1 includes, for example, a socket 10, a light-emitting module 20, a power feed part 30, and a heat transfer part 40.

The socket 10 includes, for example, an attaching part 11, a bayonet 12, a flange 13, a radiation fin 14, and a connector holder 15.

The attaching part 11 is provided on a surface of the flange 13 on an opposite side to a side where the radiation fin 14 is provided. An outer shape of the attaching part 11 may be columnar. The outer shape of the attaching part 11 is, for example, cylindrical. The attaching part 11 has, for example, a recess 11*a* that opens at an end on an opposite side to the flange 13 side.

The bayonet 12 is provided, for example, on a side surface of the attaching part 11. The bayonet 12 protrudes toward an outer side of the vehicle lighting device 1. The bayonet 12 faces the flange 13. Multiple bayonet 12 may be provided. The bayonet 12 is used, for example, when installing the vehicle lighting device 1 on a housing 101 of a vehicle lamp 100, which will be described later. The bayonet 12 may be used for twist locks.

The flange 13 has a plate shape. The flange 13 has, for example, a substantially disk shape. A side surface of the flange 13 is located further outward of the vehicle lighting device 1 than a side surface of the bayonet 12.

The radiation fin 14 is provided on an opposite of the flange 13 from the attaching part 11 side. At least one radiation fin 14 may be provided. For example, as shown in FIG. 1, the socket 10 may be provided with multiple radiation fins 14. The multiple radiation fins 14 may be arranged side by side in a predetermined direction. The radiation fins 14 have, for example, a plate shape or a cylindrical shape.

The connector holder 15 is provided on the opposite side of the flange 13 from the attaching part 11 side. The connector holder 15 may be provided side by side with the radiation fins 14. The connector holder 15 has a cylindrical shape, and a connector 105 having a seal member 105*a* is inserted therein.

The socket 10 has a function of holding the light-emitting module 20 and the power feed part 30, and a function of transferring heat generated in the light-emitting module 20 to the outside. Thus, the socket 10 is preferably formed from a material having high thermal conductivity. The socket 10 may be formed from metal, such as an aluminum alloy, for example.

Further, the socket 10 may also be made of, for example, a highly thermally conductive resin. The highly thermally conductive resin is, for example, a resin such as PET (polyethylene terephthalate) or nylon mixed with a filler using carbon, aluminum oxide, or the like. If the socket 10 is one that includes a highly thermally conductive resin, then heat generated in the light-emitting module 20 may be efficiently dissipated. Further, the weight of the socket 10 can be decreased.

The power feed part 30 includes, for example, multiple power feed terminals 31 and a holding part 32.

The multiple power feed terminals 31 may be made into a rod-shaped body. One end of the multiple power feed terminals 31 protrudes from a bottom surface 11*al* of the recess 11*a*. One end of the multiple power feed terminals 31 is soldered to a wiring pattern 21*a* provided on a substrate 21. The other end of the multiple power feed terminals 31 is exposed inside a hole of the connector holder 15. The connector 105 is fitted into the multiple power feed terminals 31 exposed inside the hole of the connector holder 15. The multiple power feed terminals 31 are made of metal such as copper alloy, for example. Moreover, the shape, arrangement, material, etc. of the multiple power feed terminals 31 are not limited to those illustrated, and may be changed as appropriate.

In a case where the socket 10 is formed using, for example, a highly thermally conductive resin containing a carbon filler, metal, or the like, the socket 10 becomes electrically conductive. Thus, the holding part 32 is provided to insulate between the multiple power feed terminals 31 and the electrically conductive socket 10. Moreover, in a case where the socket 10 is formed using a highly thermally conductive resin having insulating properties (for example, a highly thermally conductive resin containing a filler using aluminum oxide), the holding part 32 may be omitted. For example, the holding part 32 may be press-fitted into a hole provided in the socket or may be adhered to an inner wall of the hole.

The heat transfer part 40 is provided between the socket 10 and the light-emitting module (substrate 21). As shown in FIGS. 1 and 2, the heat transfer part 40 is provided, for example, inside a recess 11*b* that opens on the bottom surface 11*al* of the recess 11*a*. For example, the heat transfer part 40 may be adhered to the inner wall of the recess 11*b*, attached to the inside of the recess 11*b* via thermal conductive grease (thermal grease grease), or embedded inside the recess 11*b* by an insert molding method. The heat transfer part 40 is formed from a material having high thermal conductivity. For example, the heat transfer part 40 may be formed from metal such as aluminum, aluminum alloy, copper, copper alloy, or the like. Moreover, in a case where the socket 10 is made of metal or in a case where the light-emitting module 20 generates little heat, the heat transfer part 40 may also be omitted.

The light-emitting module 20 includes, for example, the substrate 21, a light-emitting element 22, a frame part 23, a sealing part 24, and a circuit element 25.

The substrate 21 is provided on one end side of the socket 10. The substrate 21 may be adhered onto the heat transfer part 40, for example. In such a case, the adhesive is preferably an adhesive having high thermal conductivity. For example, the adhesive may be an adhesive mixed with a filler made of an electrically conductive material or an inorganic material.

The substrate 21 has a plate shape. A planar shape of the substrate 21 (the shape when viewed from the direction along a central axis 1*a* of the vehicle lighting device 1) is, for example, a substantially rectangle. The substrate 21 may be made of, for example, an inorganic material such as ceramics (e.g. aluminum oxide or aluminum nitride), or an organic material such as paper phenol or glass epoxy. Further, the substrate 21 may be a metal core substrate in which a surface of a metal plate is coated with an insulating material. Further, the substrate 21 may have a single layer structure or a multilayer structure.

Further, the wiring pattern 21*a* is provided on the surface of the substrate 21. The wiring pattern 21*a* is formed of, for example, a material containing silver as a main component, a material containing copper as a main component, or the like.

The light-emitting element 22 is provided on the substrate 21 (on a surface of the substrate 21 opposite to the socket 10 side). The light-emitting element 22 is electrically connected to the wiring pattern 21*a*. At least one light-emitting element 22 may be provided. The vehicle lighting device 1 (the light-emitting module 20) shown in FIGS. 1 and 2 is provided with multiple light-emitting elements 22. In a case where multiple light-emitting elements 22 are provided, the multiple light-emitting elements 22 may be connected in series.

The light-emitting element 22 may be, for example, a light-emitting diode, an organic light-emitting diode, a laser diode, or the like.

The light-emitting element 22 may be a chip-shaped light-emitting element, a surface-mounted light-emitting element such as a PLCC (Plastic Leaded Chip Carrier) type, or a light-emitting element with a lead wire such as a bullet type. The light-emitting element 22 shown in FIG. 2 is a chip-shaped light-emitting element. In such a case, in consideration of downsize of the light-emitting module 20 and, by extension, downsize of the vehicle lighting device 1, it is preferable to use a chip-shaped light-emitting element. In the following, a case where the light-emitting element 22 is a chip-shaped light-emitting element will be described as an example.

The chip-shaped light-emitting element 22 may be mounted on the wiring pattern 21*a* by COB (Chip On Board). The chip-shaped light-emitting element 22 may be any of an upper electrode type light-emitting element, an upper and lower electrode type light-emitting element, and a flip chip type light-emitting element.

The frame part 23 is provided on the substrate 21. The frame part 23 is adhered to the substrate 21. The frame part 23 has a frame shape and surrounds the light-emitting element 22. The frame part 23 is made of, for example, thermoplastic resin. The frame part 23 may have the function of specifying the formation range of the sealing part 24 and the function of a reflector. Moreover, the frame part 23 may also be omitted. In a case where the frame part 23 is omitted, a dome-shaped sealing part 24 is provided on the substrate 21, for example.

The sealing part 24 is provided on an inner side of the frame part 23. The sealing part 24 is provided so as to cover a region surrounded by the frame part 23. The sealing part 24 is provided so as to cover the light-emitting element 22. The sealing part 24 includes a resin having translucency. The resin is, for example, silicone resin. Further, the sealing part 24 may also include a phosphor.

Moreover, optical elements and the like may be provided as necessary. The optical element is, for example, a convex lens, a concave lens, a light guide, or the like. The optical element may be provided on the sealing part 24, for example.

The circuit element 25 may be a passive element or an active element configured to configure a light-emitting circuit 20*a* having the light-emitting element 22. The circuit element is provided on the substrate 21. The circuit element 25 is provided, for example, around the frame part 23 and electrically connected to the wiring pattern 21*a*. The circuit element 25 is electrically connected to the light-emitting element 22 via the wiring pattern 21*a*.

Figure 3:
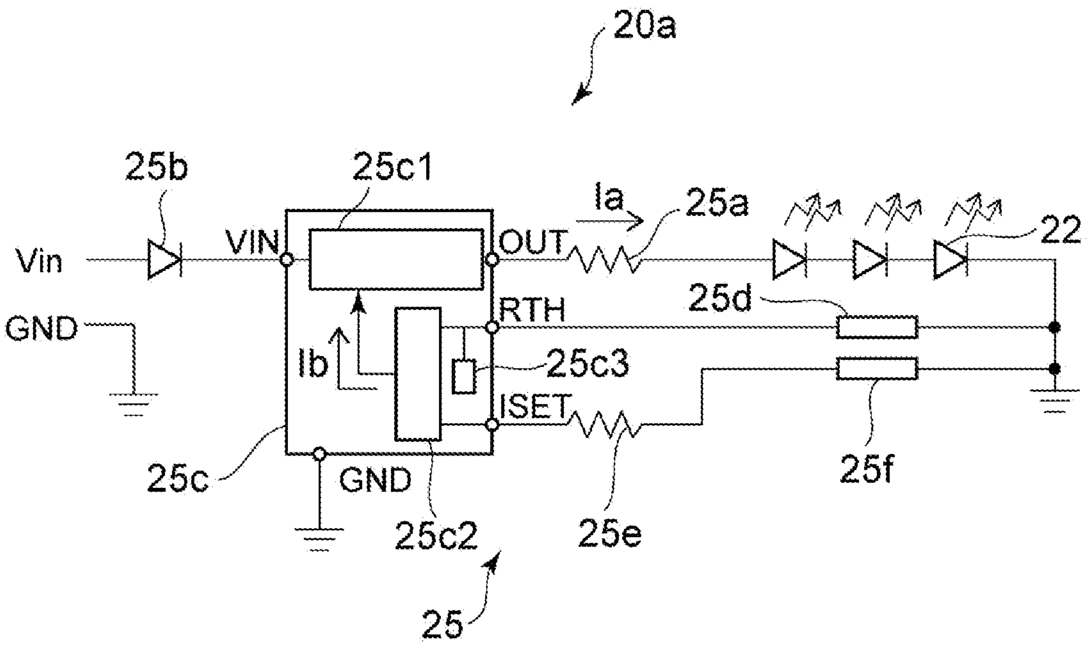
FIG. 3 is a circuit diagram for illustrating a light-emitting circuit.

FIG. 3 is a circuit diagram for illustrating the light-emitting circuit 20*a*.

As shown in FIG. 3, the light-emitting circuit 20*a* includes, for example, the light-emitting element 22 and the circuit element 25. The circuit element 25 may be, for example, a resistor 25*a*, a protection element 25*b*, a control element 25*c*, a negative characteristic thermistor 25*d* (corresponding to an example of a first negative characteristic thermistor), a resistor 25*e*, and a positive characteristic thermistor 25*f* (corresponding to an example of a second positive characteristic thermistor). The circuit element 25 provided in the light-emitting circuit 20*a* is not limited to those illustrated. For example, the light-emitting circuit 20*a* may further include a capacitor, an inductor, a surge absorber, a varistor, an integrated circuit, an arithmetic element, etc. in addition to those described above.

As shown in FIGS. 1 and 2, the resistor 25*a* may be, for example, a surface-mounted resistor, a resistor with lead wires (metal oxide film resistor), a film resistor formed using methods such as screen printing. Moreover, the resistor 25*a* shown in FIG. 1 is a surface-mounted resistor.

Here, since there are deviations in the forward voltage characteristics of the light-emitting element 22, if an applied voltage between an anode terminal and a ground terminal is constant, deviations occur in a brightness (luminous flux, luminance, luminosity, and illuminance) of the light irradiated from the light-emitting element 22. Thus, to ensure that the brightness of the light irradiated from the light-emitting element 22 falls within a predetermined range, a value of the current flowing in the light-emitting element 22 is kept within a predetermined range by the resistor 25*a* connected in series with the light-emitting element 22. In such a case, by changing a resistance value of the resistor 25*a*, the value of the current flowing in the light-emitting element 22 is made to be within a predetermined range.

In a case where the resistor 25*a* is a surface-mounted resistor, a resistor with a lead wire, or the like, the resistor 25*a* having an appropriate resistance value is selected according to the forward voltage characteristics of the light-emitting element 22. In a case where the resistor 25*a* is a film resistor, the resistance value may be increased by removing a part of the resistor 25*a*. For example, by irradiating a film resistor with a laser beam, a part of the film resistor may be easily removed. Moreover, the number, arrangement, size, etc. of the resistor 25*a* is not limited to those illustrated, and may be changed as appropriate depending on the number, specifications, etc. of the light-emitting elements 22.

The protection element 25*b* is provided, for example, to prevent a reverse voltage from being applied to the light-emitting element 22 and to prevent pulse noise from being applied to the light-emitting element 22 from the opposite direction. The protection element 25*b* is, for example, a diode. The protection element 25*b* shown in FIG. 1 is a surface-mounted diode.

The control element 25*c* controls the current (output current Ia) flowing to the light-emitting element 22 according to the ambient temperature of the light-emitting element 22. For example, the control element 25*c* may be an integrated circuit capable of performing temperature derating.

As shown in FIG. 3, the control element 25*c* has a VIN terminal, an OUT terminal, an RTH terminal (corresponding to an example of a first input side), an ISET terminal (corresponding to an example of a second input side), and a GND terminal. For example, a battery installed on a vehicle is electrically connected to the VIN terminal via the protection element 25*b*. The light-emitting element 22 is electrically connected to the OUT terminal via, for example, the resistor 25*a*. In such a case, an anode of the light-emitting element 22 is electrically connected to the OUT terminal. A cathode of the light-emitting element 22 is electrically connected to a ground of the vehicle, such as the chassis of the vehicle body. For example, the resistor 25*e* and the positive characteristic thermistor 25*f* connected in series are electrically connected to the ISET terminal (corresponding to an example of a second circuit). The negative characteristic thermistor 25*d* is electrically connected to the RTH terminal (corresponding to an example of the first circuit). The GND terminal is electrically connected to the ground of the vehicle, for example.

Further, the control element 25*c* includes, for example, a current driver 25*cl*, a current setting circuit 25*c*2, and a constant current circuit 25*c*3.

An input side of the current driver 25*cl* is electrically connected to the VIN terminal. An output side of the current driver 25*cl* is electrically connected to the light-emitting element 22 via an OUT terminal. The current driver 25*cl* generates a current (output current Ia) flowing to the light-emitting element 22. The current driver 25*cl* performs constant current control on the output current Ia such that the output current Ia has a predetermined value. The current driver 25*cl* includes, for example, a constant current circuit including an output transistor, a sense resistor, an error amplifier, and the like. Moreover, a target value of the output current Ia is set based on a setting current Ib from the current setting circuit 25*c*2.

One input side of the current setting circuit 25*c*2 is electrically connected to the negative characteristic thermistor 25*d* via the RTH terminal. The other input side of the current setting circuit 25*c*2 is electrically connected to the resistor 25*e* and the positive characteristic thermistor 25*f* via the ISET terminal. The output side of the current setting circuit 25*c*2 is electrically connected to the current driver 25*cl*. The current setting circuit 25*c*2 generates the setting current Ib for setting the target value of the output current Ia. The setting current Ib is generated based on changes in a resistance value of the negative characteristic thermistor 25*d* electrically connected to the RTH terminal. If the resistance value of the negative characteristic thermistor 25*d* electrically connected to the RTH terminal decreases, the current setting circuit 25*c*2 performs adjustment to decrease the output current Ia.

Further, the current setting circuit 25*c*2 adjusts the setting current Ib based on a terminal voltage generated at the ISET terminal. If a combined resistance value of the resistor 25*e* and the positive characteristic thermistor 25*f* electrically connected to the ISET terminal increases, the current setting circuit 25*c*2 performs adjustment to increase a ratio of decreasing the output current Ia.

The constant current circuit 25*c*3 is electrically connected between the input side of the current setting circuit 25*c*2 and the RTH terminal. The constant current circuit 25*c*3 causes a current of a predetermined value to flow in the negative characteristic thermistor 25*d* via the RTH terminal. Thus, a terminal voltage based on changes in the resistance value of the negative characteristic thermistor 25*d* is generated at the RTH terminal.

The resistance value of the negative characteristic thermistor 25*d* decreases when the temperature exceeds a predetermined temperature (Curie temperature).

Further, a resistance value of the positive characteristic thermistor 25*f* increases when the temperature exceeds a predetermined temperature (Curie temperature). In such a case, for example, the Curie temperature of the positive characteristic thermistor 25*f* is higher than the Curie temperature of the negative characteristic thermistor 25*d*. The negative characteristic thermistor 25*d* and the positive characteristic thermistor 25*f* may be, for example, surface-mounted thermistors.

The resistor 25*e* may be, for example, a surface-mounted resistor, a resistor with lead wires (metal oxide film resistor), or a film resistor formed by a screen printing method or the like. Moreover, the resistor 25*e* shown in FIG. 1 is a surface-mounted resistor.

As will be described later, the current setting circuit 25*c*2 generates the setting current Ib for setting the output current Ia that the current driver 25*cl* causes to flow to the light-emitting element 22, based on the resistance value of the negative characteristic thermistor 25*d* electrically connected to the RTH terminal. Further, the current setting circuit 25*c*2 adjusts the setting current Ib based on the resistance value of the positive characteristic thermistor 25*f* electrically connected to the ISET terminal.

Here, a light-emitting circuit 120*a* according to a comparative example will be illustrated.

Figure 4:
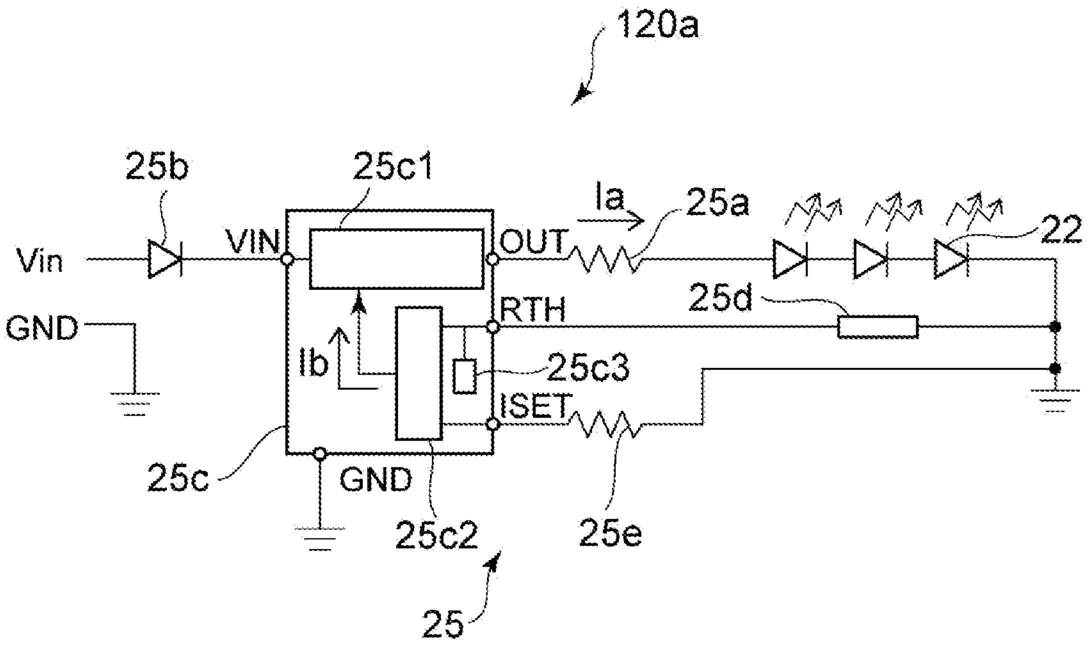
FIG. 4 is a circuit diagram for illustrating a light-emitting circuit according to a comparative example.

FIG. 4 is a circuit diagram for illustrating the light-emitting circuit 120*a* according to the comparative example.

As shown in FIG. 4, the light-emitting circuit 120*a* includes the light-emitting element 22, the resistor 25*a*, the protection element 25*b*, the control element 25*c*, the negative characteristic thermistor 25*d*, and the resistor 25*e*. That is, the light-emitting circuit 120*a* is not provided with the positive characteristic thermistor 25*f* provided in the light-emitting circuit 20*a*.

Figure 5:
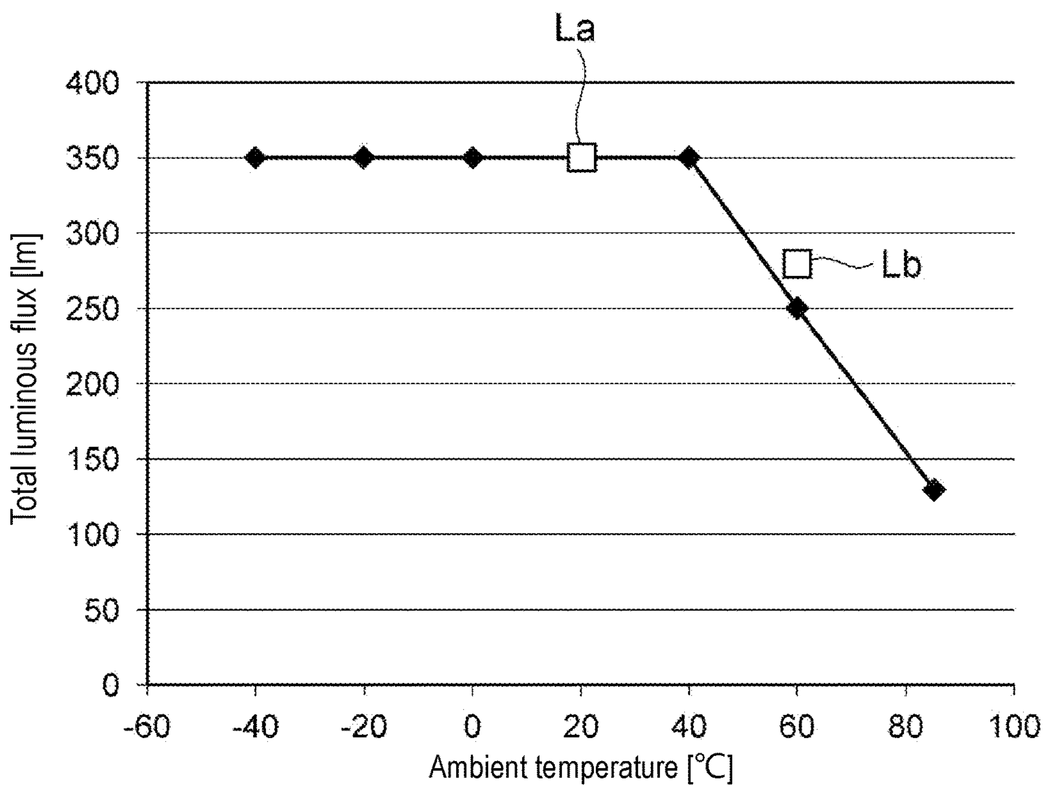
FIG. 5 is a graph for illustrating effects of a light-emitting circuit according to a comparative example.
Figure 6:
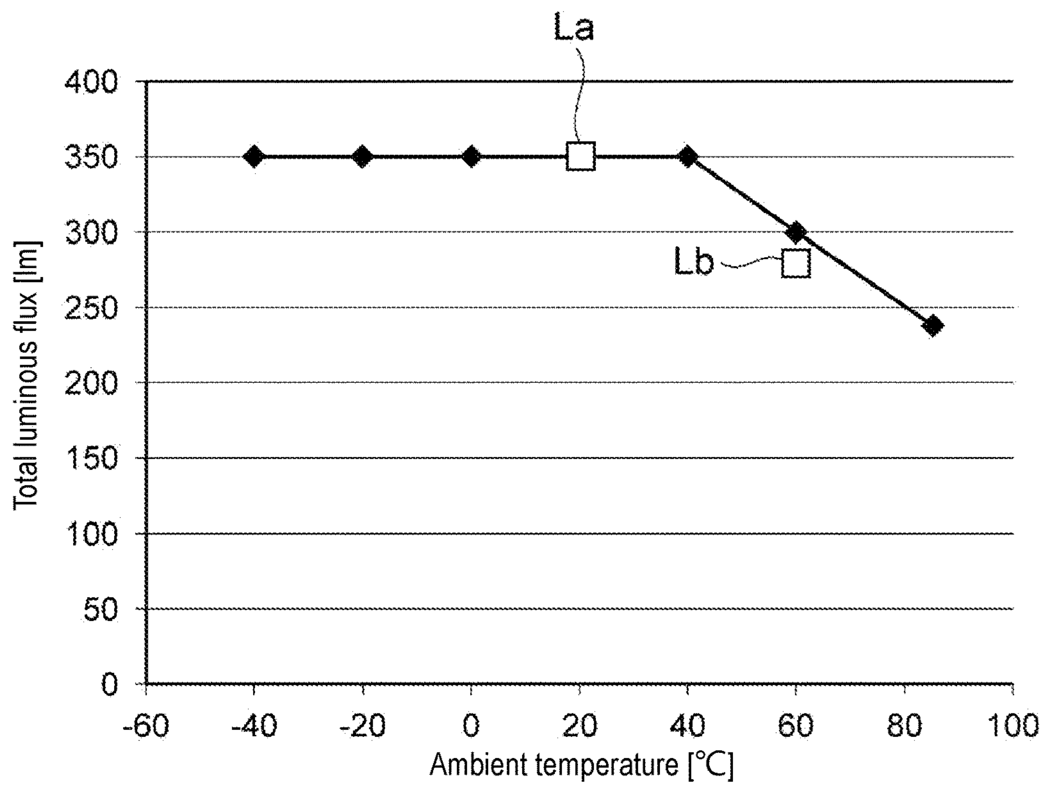
FIG. 6 is a graph for illustrating effects of a light-emitting circuit according to a comparative example.

FIGS. 5 and 6 are graphs for illustrating effects of the light-emitting circuit 120*a* according to a comparative example.

"La" described in FIGS. 5 and 6 is the total luminous flux (for example, 350 lumens) required when the ambient temperature of the light-emitting element 22 is 20° C. "Lb" is the total luminous flux (for example, 280 lumens) required when the ambient temperature of the light-emitting element 22 is 60° C.

As shown in FIG. 5, since the light-emitting circuit 120*a* is also provided with the control element 25*c*, the current flowing in the light-emitting element 22 may be controlled according to the ambient temperature of the light-emitting element 22. That is, temperature derating is performed also in the light-emitting circuit 120*a*.

In such a case, the current setting circuit 25$c$2 generates the setting current Ib based on changes in the resistance value of the negative characteristic thermistor 25$d$ electrically connected to the RTH terminal. Further, the current setting circuit 25$c$2 adjusts the setting current Ib based on the terminal voltage generated at the ISET terminal. Since only the resistor 25$e$ is connected to the ISET terminal, a terminal voltage corresponding to the resistance value of the resistor 25$e$ is generated.

Further, the current driver 25$cl$ sets the target value of the output current Ia based on the setting current Ib from the current setting circuit 25$c$2.

When the temperature of the negative characteristic thermistor 25$d$ is equal to or lower than the Curie temperature of the negative characteristic thermistor 25$d$ (for example, the ambient temperature of the light-emitting element 22 is 40° C. or below), there is almost no change in the resistance value of the negative characteristic thermistor 25$d$ electrically connected to the RTH terminal. Thus, with the current setting circuit 25$c$2, there is almost no change in the setting current Ib generated based on the resistance value of the negative characteristic thermistor 25$d$. In such a case, for example, the resistance value of the resistor 25$e$ electrically connected to the ISET terminal is set such that the output current Ia satisfying the total luminous flux La required when the temperature is 20° C. is output from the current driver 25$cl$. In such a case, for example, if the resistance value of the resistor 25$e$ electrically connected to the ISET terminal decreases, the output current Ia increases. Further, if the resistance value of the resistor 25$e$ electrically connected to the ISET terminal increases, the output current Ia decreases.

If the temperature of the negative characteristic thermistor 25$d$ exceeds the Curie temperature of the negative characteristic thermistor 25$d$ (for example, the ambient temperature of the light-emitting element 22 exceeds 40° C.), the resistance value of the negative characteristic thermistor 25$d$ electrically connected to the RTH terminal decreases. Thus, the current setting circuit 25$c$2 generates the setting current Ib based on changes in the resistance value of the negative characteristic thermistor 25$d$. In such a case, if the resistance value of the negative characteristic thermistor 25$d$ electrically connected to the RTH terminal decreases, the output current Ia decreases.

In such a case, as shown in FIG. 5, the total luminous flux Lb required when the ambient temperature of the light-emitting element 22 reaches a predetermined temperature (for example, 60° C.) may not be satisfied.

In such a case, the setting current Ib, and, by extension, the output current Ia, may be adjusted by the resistance value of the resistor 25$e$ electrically connected to the ISET terminal.

Thus, by selecting the resistor 25$e$ that is electrically connected to the ISET terminal and having an appropriate resistance value, or by changing the resistance value of the resistor 25$e$, as shown in FIG. 6, the total luminous flux Lb required when the predetermined temperature is reached (for example, 60° C.) may be satisfied. For example, by decreasing the resistance value of the resistor 25$e$ electrically connected to the ISET terminal, adjustment may be made to increase the output current Ia.

However, in this way, when the ambient temperature of the light-emitting element 22 becomes even higher (e.g. 80° C.), the decrease in the total luminous flux (the decrease in the output current Ia flowing in the light-emitting element 22) becomes too small. Thus, the temperature of the light-emitting element 22 may become too high, and the temperature of the light-emitting element 22 may exceed the maximum junction temperature.

Thus, in the light-emitting circuit 20$a$ according to the embodiment, the positive characteristic thermistor 25$f$ connected in series with the resistor 25$e$ is further electrically connected to the ISET terminal of the control element 25$c$.

If the positive characteristic thermistor 25$f$ is provided, a terminal voltage is generated at the RTH terminal based on changes in the ambient temperature of the light-emitting element 22. Thus, based on changes in the ambient temperature of the light-emitting element 22, the setting current Ib and, by extension, the output current Ia may be changed.

In such a case, when the temperature of the positive characteristic thermistor 25$f$ is equal to or lower than the Curie temperature of the positive characteristic thermistor 25$f$ (for example, the ambient temperature of the light-emitting element 22 is 60° C. or below), there is almost no change in the resistance value of the positive characteristic thermistor 25$f$. When the ambient temperature of the light-emitting element 22 is near the Curie temperature of the positive characteristic thermistor 25$f$, the amount of change in resistance value is small.

The higher the temperature of the positive characteristic thermistor 25$f$ is higher than the Curie temperature of the positive characteristic thermistor 25$f$ (for example, as the ambient temperature of the light-emitting element 22 becomes higher than 60° C), the more rapidly the resistance value of the positive characteristic thermistor 25$f$ increases.

Figure 7:
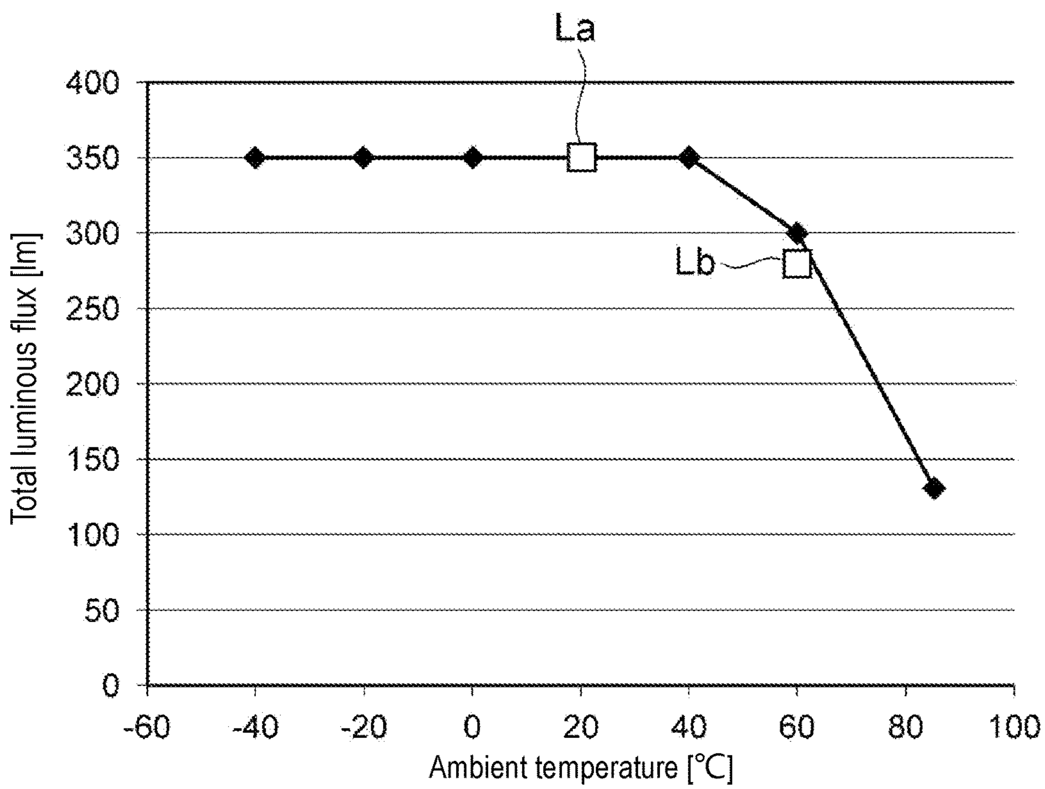
FIG. 7 is a graph for illustrating effects of a light-emitting circuit according to the embodiment.

FIG. 7 is a graph for illustrating effects of the light-emitting circuit 20$a$ according to this embodiment.

In a region where the temperature of the negative characteristic thermistor 25$d$ is equal to or lower than the Curie temperature of the negative characteristic thermistor 25$d$ and the temperature of the positive characteristic thermistor 25$f$ is equal to or lower than the Curie temperature of the positive characteristic thermistor 25$f$ (for example, in a temperature region where the ambient temperature of the light-emitting element 22 is 40° C. or below), the setting current Ib is set based on the resistance value of the resistor 25$e$ electrically connected to ISET terminal. Thus, as shown in FIG. 7, there is almost no change in the total luminous flux of light irradiated from the light-emitting element 22.

In a region where the temperature of the negative characteristic thermistor 25$d$ exceeds the Curie temperature of the negative characteristic thermistor 25$d$ and the temperature of the positive characteristic thermistor 25$f$ is equal to or lower than the Curie temperature of the positive characteristic thermistor 25$f$ (for example, a temperature region where the ambient temperature of the light-emitting element 22 exceeds 40° C. (corresponding to an example of the first temperature) and 60° C. (corresponding to the second temperature), the setting current Ib is set based on the decrease in the resistance value of the negative characteristic thermistor 25$d$ electrically connected to the RTH terminal. If the resistance value of the negative characteristic thermistor 25$d$ electrically connected to the RTH terminal decreases, the output current Ia decreases. Thus, as shown in FIG. 7, the total luminous flux of light irradiated from the light-emitting element 22 decreases as the temperature rises. That is, since the output current Ia decreases due to temperature derating, the total luminous flux of light irradiated from the light-emitting element 22 decreases.

In a region where the temperature of the negative characteristic thermistor 25$d$ exceeds the Curie temperature of the negative characteristic thermistor 25$d$ and the temperature of the positive characteristic thermistor 25$f$ exceeds the Curie temperature of the positive characteristic thermistor **25*f* (for example, in a temperature region where the ambient temperature of the light-emitting element 22 exceeds 60° C.), the setting current Ib is adjusted according to the increase in resistance value of the positive characteristic thermistor 25*f* electrically connected to ISET terminal, and a ratio in which the output current Ia decreases increases. If a combined resistance value of the resistor 25*e* electrically connected to the ISET terminal and the positive characteristic thermistor 25*f* increases as the resistance value of the positive characteristic thermistor 25*f* increases, the output current Ia further decreases. As a result, as shown in FIG. 7**, a ratio in which the total luminous flux decreases may be increased.

That is, in a region where the ambient temperature of the light-emitting element 22 is high, the ratio of decreasing the total luminous flux may be changed.

In such a case, for example, when the total luminous flux Lb required when the ambient temperature of the light-emitting element 22 is 60° C. is specified, for example, it is preferable to measure the temperature of the positive characteristic thermistor **25*f* when the ambient temperature of the light-emitting element 22 is 60° C. (for example, 120° C.±10° C.) and select the positive characteristic thermistor 25*f* whose Curie temperature is the measured temperature (for example, 120° C.±10° C.). In this way, it is possible to obtain the required total luminous flux in a region where the ambient temperature of the light-emitting element 22 is high, and suppress a rise in the temperature of the light-emitting element 22**.

As described above, if the resistance value of the negative characteristic thermistor **25*d* electrically connected to the RTH terminal decreases, the current setting circuit 25*c*2 generates the setting current Ib in which the output current Ia decreases. If the resistance value of the positive characteristic thermistor 25*f* electrically connected to the ISET terminal increases, the current setting circuit 25*c*2** adjusts the setting current Ib to increase the ratio in which the output current Ia decreases.

Here, the total luminous flux of light irradiated from the light-emitting element 22 may decrease as the temperature of the light-emitting element 22 rises.

Figure 8:
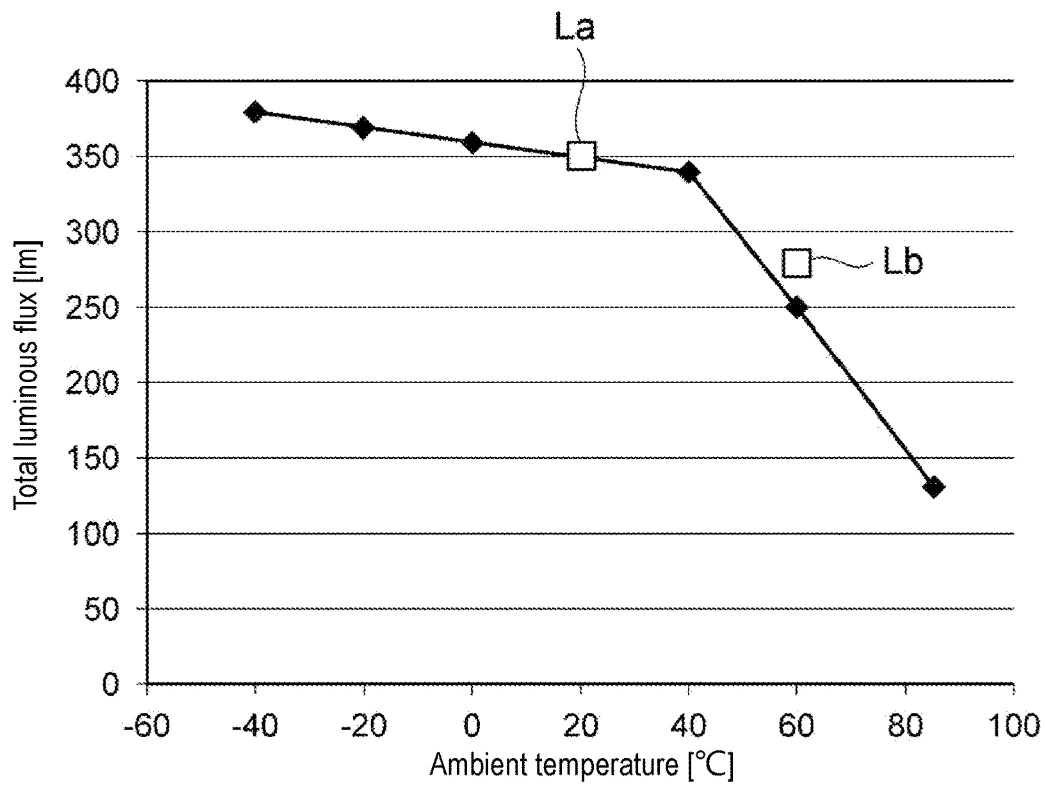
FIG. 8 is a graph for illustrating other effects of a light-emitting circuit according to a comparative example.

FIG. 8 is a graph for illustrating other effects of the light-emitting circuit **120*a*** according to a comparative example.

When the ambient temperature of the light-emitting element 22 is low (for example, 40° C. or less), since there is almost no change in the resistance value of the negative characteristic thermistor **25*d* electrically connected to RTH terminal, a substantially constant output current Ia flows in the light-emitting element 22**.

Thus, as shown in FIG. 8, in a region where the ambient temperature of the light-emitting element 22 is low (for example, a region of 40° C. or lower), the total luminous flux may decrease as the ambient temperature of the light-emitting element 22 rises.

Figure 9:
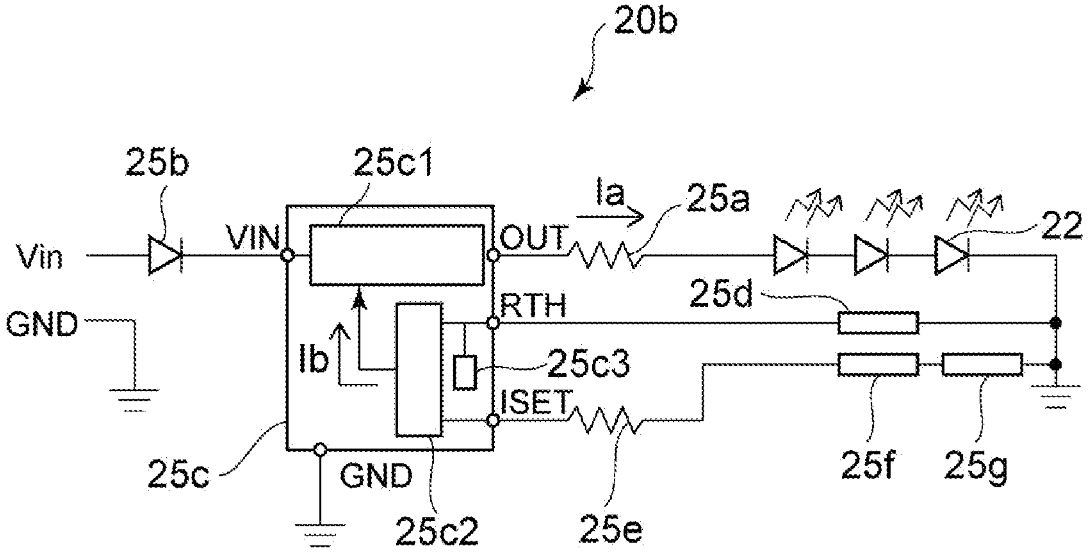
FIG. 9 is a circuit diagram for illustrating a light-emitting circuit according to another embodiment.

FIG. 9 is a circuit diagram for illustrating a light-emitting circuit **20*b*** according to another embodiment.

Figure 10:
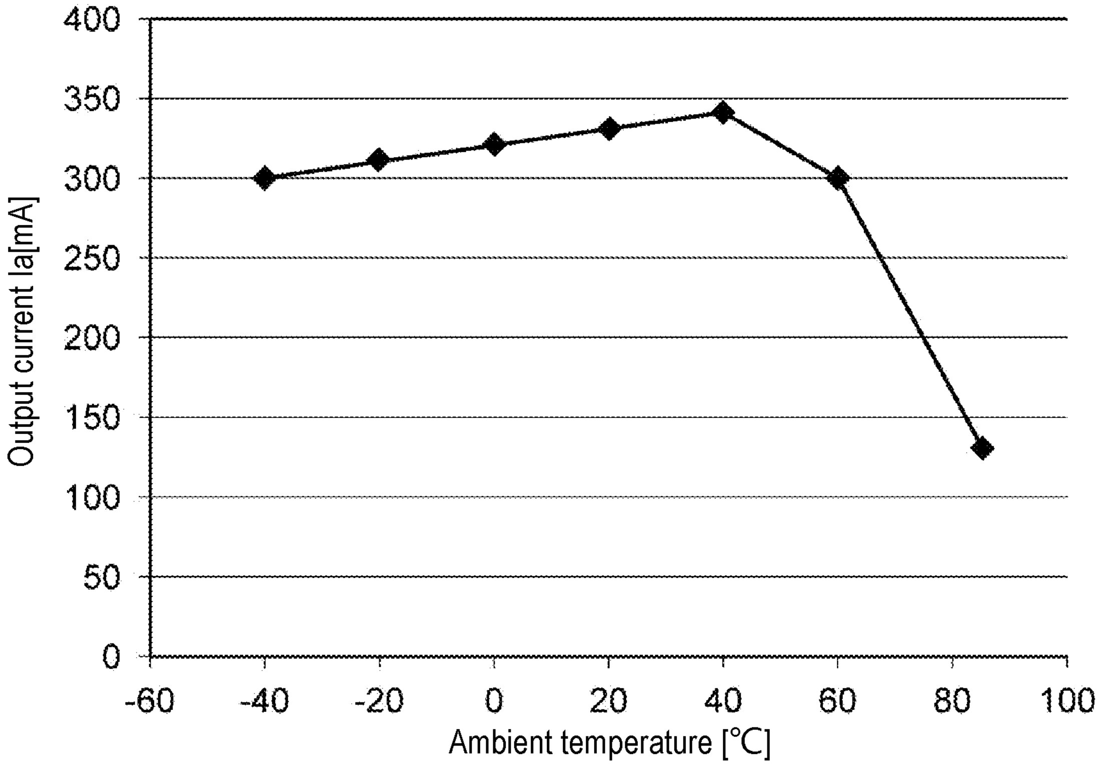
FIG. 10 is a graph for illustrating effects of a light-emitting circuit.

FIG. 10 is a graph for illustrating effects of the light-emitting circuit **20*b***.

As shown in FIG. 9, the light-emitting circuit **20*b*, for example, includes the light-emitting element 22, the resistor 25*a*, the protection element 25*b*, the control element 25*c*, the negative characteristic thermistor 25*d*, the resistor 25*e*, the positive characteristic thermistor 25*f*, and a negative characteristic thermistor 25*g* (corresponding to an example of a second negative characteristic thermistor). That is, the light-emitting circuit 20*b* may further add a negative characteristic thermistor 25*g* to the light-emitting circuit 20*a*** described above.

The negative characteristic thermistor **25*g* may be connected in series with the positive characteristic thermistor 25*f* and the resistor 25*e*, which are connected in series. The series-connected positive characteristic thermistor 25*f*, the resistor 25*e*, and the negative characteristic thermistor 25*g* are electrically connected to the ISET terminal (corresponding to an example of a second circuit). The negative characteristic thermistor 25*d*** is electrically connected to the RTH terminal (corresponding to an example of the first circuit).

Since a region where the ambient temperature of the light-emitting element 22 is low (for example, a region 40° C. or below) is a region where the temperature of the positive characteristic thermistor **25*f* is equal to or lower than the Curie temperature of the positive characteristic thermistor 25*f*, the resistance value of the positive characteristic thermistor 25*f* is substantially constant. Thus, in the region where the ambient temperature of the light-emitting element 22 is low, the setting current Ib and, by extension, the output current Ia changes based on changes in a resistance value of the negative characteristic thermistor 25*g*** electrically connected to the ISET terminal.

Since the resistance value of the negative characteristic thermistor **25*g* electrically connected to the ISET terminal decreases as the temperature rises, in a region where the ambient temperature of the light-emitting element 22 is low, as the ambient temperature of the light-emitting element 22 rises, the resistance value of the negative characteristic thermistor 25*g*** decreases.

If a combined resistance value of the resistor **25*e*, the positive characteristic thermistor 25*f*, and the negative characteristic thermistor 25*g* electrically connected to the ISET terminal decreases as the resistance value of the negative characteristic thermistor 25*g* decreases, the output current Ia increases. Thus, as shown in FIG. 10, in a region where the ambient temperature of the light-emitting element 22 is low, as the ambient temperature of the light-emitting element 22 rises, the setting current Ib, and, by extension, the output current Ia, may be increased. That is, in a region where the ambient temperature of the light-emitting element 22 is low, a decrease in the total luminous flux due to a rise in the ambient temperature of the light-emitting element 22 may be offset by an increase in the total luminous flux due to an increase in the output current Ia. As a result, for example, as shown in FIG. 7, it is possible to suppress fluctuations in the total luminous flux in a region where the ambient temperature of the light-emitting element 22** is low.

As illustrated above, in a temperature region equal to or lower than the Curie temperature of the positive characteristic thermistor **25*f*, the current setting circuit 25*c*2 generates the setting current Ib that increases the output current Ia based on a decrease in the resistance value of the negative characteristic thermistor 25*g*** electrically connected to the ISET terminal.

Figure 11:
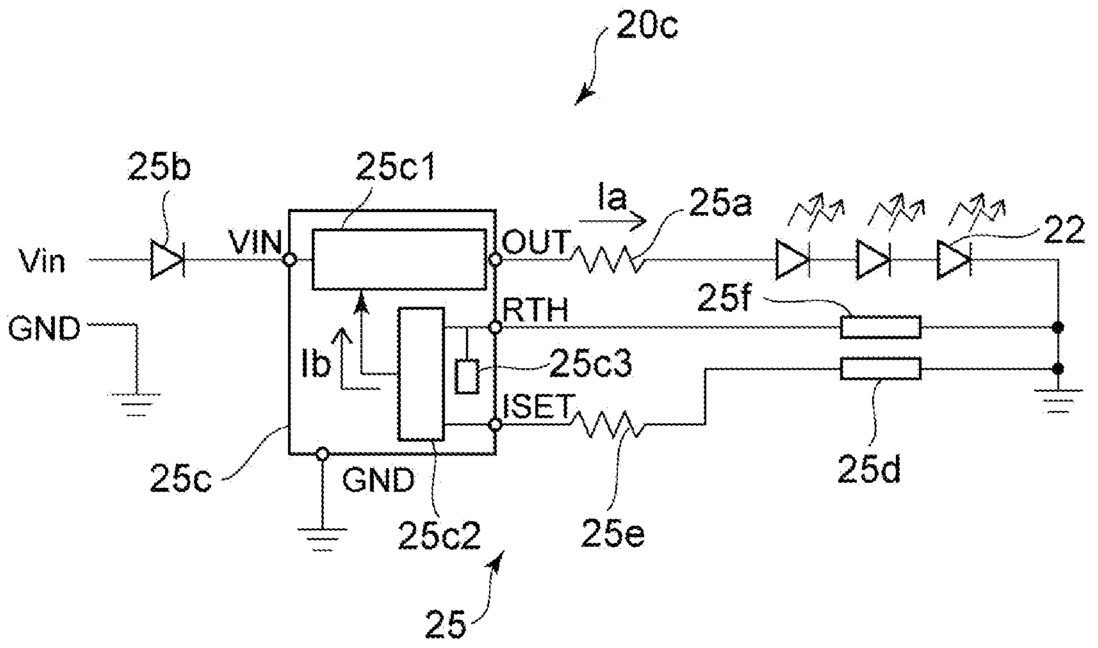
FIG. 11 is a circuit diagram for illustrating a light-emitting circuit according to another embodiment.

FIG. 11 is a circuit diagram for illustrating a light-emitting circuit **20*c*** according to another embodiment.

As shown in FIG. 11, the light-emitting circuit **20*c* includes, for example, the light-emitting element 22, the resistor 25*a*, the protection element 25*b*, the control element 25*c*, the negative characteristic thermistor 25*d*, the resistor 25*e*, and the positive characteristic thermistor 25*f*. That is, in the light-emitting circuit 20*c*, the connection positions of the negative characteristic thermistor 25*d* and the positive characteristic thermistor 25*f* in the above-mentioned light-emitting circuit 20*a*** are switched.

In such a case, for example, the resistor 25*e* and the negative characteristic thermistor 25*d* connected in series are electrically connected to the ISET terminal (corresponding to an example of a second circuit). The positive characteristic thermistor 25*f* is electrically connected to the RTH terminal (corresponding to an example of the first circuit).

In such a case, the current setting circuit 25*c*2, based on the resistance value of the positive characteristic thermistor 25*f* electrically connected to the RTH terminal, generates the setting current Ib that the current driver 25*cl* requires for setting the output current Ia flowing to the light-emitting element 22. Further, the current setting circuit 25*c*2 adjusts the setting current Ib based on a combined resistance value of the resistor 25*e* and the negative characteristic thermistor 25*d* electrically connected to the ISET terminal Here, the current setting circuit 25*c*2 of the light-emitting circuit 20*c* has a different operation setting from that of the current setting circuit 25*c*2 of the light-emitting circuit 20*a* described above.

If the resistance value of the positive characteristic thermistor 25*f* electrically connected to the RTH terminal increases, the current setting circuit 25*c*2 performs adjustment to decrease the output current Ia.

If the combined resistance value of the resistor 25*e* and the negative characteristic thermistor 25*d* electrically connected to the ISET terminal decreases, the current setting circuit 25*c*2 performs adjustment to increase the ratio of decreasing the output current Ia.

If the positive characteristic thermistor 25*f* is provided, a terminal voltage is generated at the RTH terminal based on changes in the ambient temperature of the light-emitting element 22. Thus, based on changes in the ambient temperature of the light-emitting element 22, the setting current Ib and, by extension, the output current Ia may be changed.

In such a case, when the temperature of the positive characteristic thermistor 25*f* is equal to or lower than the Curie temperature of the positive characteristic thermistor 25*f* (for example, the ambient temperature of the light-emitting element 22 is 40° C. or below), there is almost no change in the resistance value of the positive characteristic thermistor 25*f*. When the ambient temperature of the light-emitting element 22 is near the Curie temperature of the positive characteristic thermistor 25*f*, the amount of change in resistance value is small.

The higher the temperature of the positive characteristic thermistor 25*f* is higher than the Curie temperature of the positive characteristic thermistor 25*f* (for example, as the ambient temperature of the light-emitting element 22 becomes higher than 40° C.), the more rapidly the resistance value of the positive characteristic thermistor 25*f* increases.

Thus, the current setting circuit 25*c*2 generates the setting current Ib for decreasing the output current Ia based on the increase in the resistance value of the positive characteristic thermistor 25*f*.

Moreover, as the ambient temperature of the light-emitting element 22 becomes even higher (for example, as the ambient temperature of the light-emitting element 22 becomes higher than 60° C.), the resistance value of the negative characteristic thermistor 25*d* electrically connected to the ISET terminal decreases, so the current setting circuit 25*c*2 increases the ratio of decreasing the output current Ia based on the amount of decrease in the resistance value of the negative characteristic thermistor 25*d*.

As illustrated above, even with the structure of the light-emitting circuit 20*c*, the same effects as the light-emitting circuit 20*a* described above can be obtained.

Figure 12:
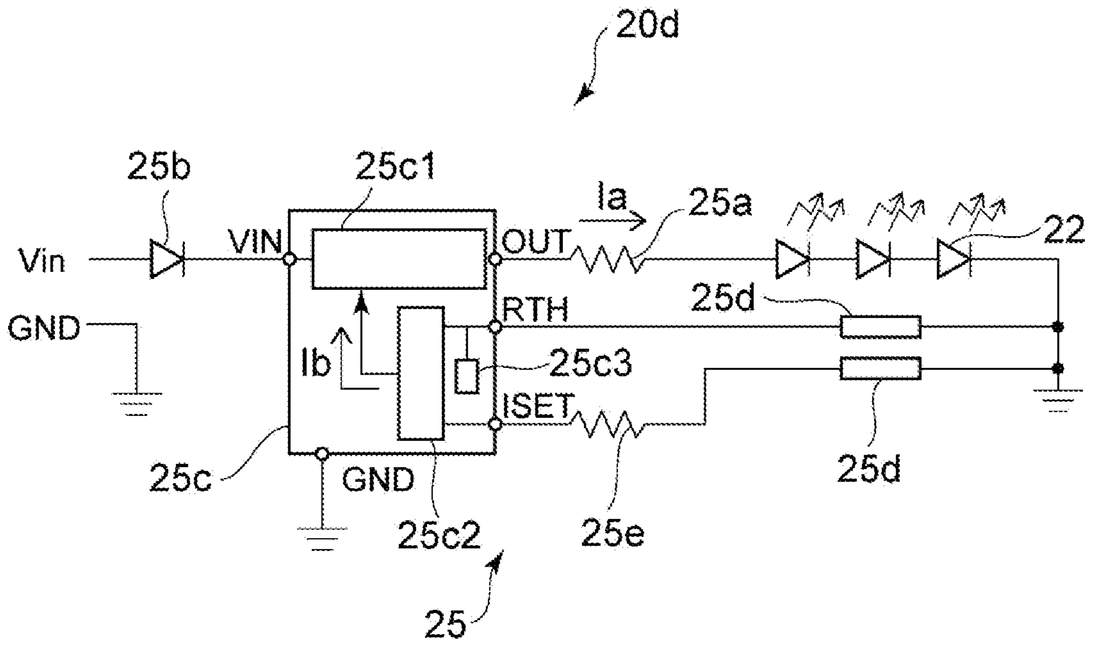
FIG. 12 is a circuit diagram for illustrating a light-emitting circuit according to another embodiment.

FIG. 12 is a circuit diagram for illustrating a light-emitting circuit 20*d* according to another embodiment.

As shown in FIG. 12, the light-emitting circuit 20*d* includes, for example, the light-emitting element 22, the resistor 25*a*, the protection element 25*b*, the control element 25*c*, the negative characteristic thermistors 25*d*, and the resistor 25*e*. That is, in the light-emitting circuit 20*d*, the positive characteristic thermistor 25*f* in the above-mentioned light-emitting circuit 20*a* is replaced with the negative characteristic thermistor 25*d*.

In such a case, for example, the resistor 25*e* and the negative characteristic thermistor 25*d* connected in series are electrically connected to the ISET terminal (corresponding to an example of a second circuit). The negative characteristic thermistor 25*d* is electrically connected to the RTH terminal (corresponding to an example of the first circuit).

In such a case, the current setting circuit 25*c*2, based on the resistance value of the negative characteristic thermistor 25*d* electrically connected to the RTH terminal, generates the setting current Ib that the current driver 25*cl* requires for setting the output current Ia flowing to the light-emitting element 22. Further, the current setting circuit 25*c*2 adjusts the setting current Ib based on the combined resistance value of the resistor 25*e* and the negative characteristic thermistor 25*d* electrically connected to the ISET terminal.

Here, the current setting circuit 25*c*2 of the light-emitting circuit 20*d* has a different operation setting from that of the current setting circuit 25*c*2 of the light-emitting circuit 20*a* described above.

If the resistance value of the negative characteristic thermistor 25*d* electrically connected to the RTH terminal decreases, the current setting circuit 25*c*2 performs adjustment to decrease the output current Ia.

If the combined resistance value of the resistor 25*e* and the negative characteristic thermistor 25*d* electrically connected to the ISET terminal decreases, the current setting circuit 25*c*2 performs adjustment to increase the ratio of decreasing the output current Ia.

Thus, as in the case of the light-emitting circuit 20*a* described above, the current setting circuit 25*c*2 may change the setting current Ib, and, by extension, the output current Ia, based on changes in the ambient temperature of the light-emitting element 22. Further, the setting current Ib may be adjusted in the same manner as in the case of the light-emitting circuit 20*c* described above.

As illustrated above, even with the structure of the light-emitting circuit 20*d*, the same effects as the light-emitting circuit 20*a* described above can be obtained.

Figure 13:
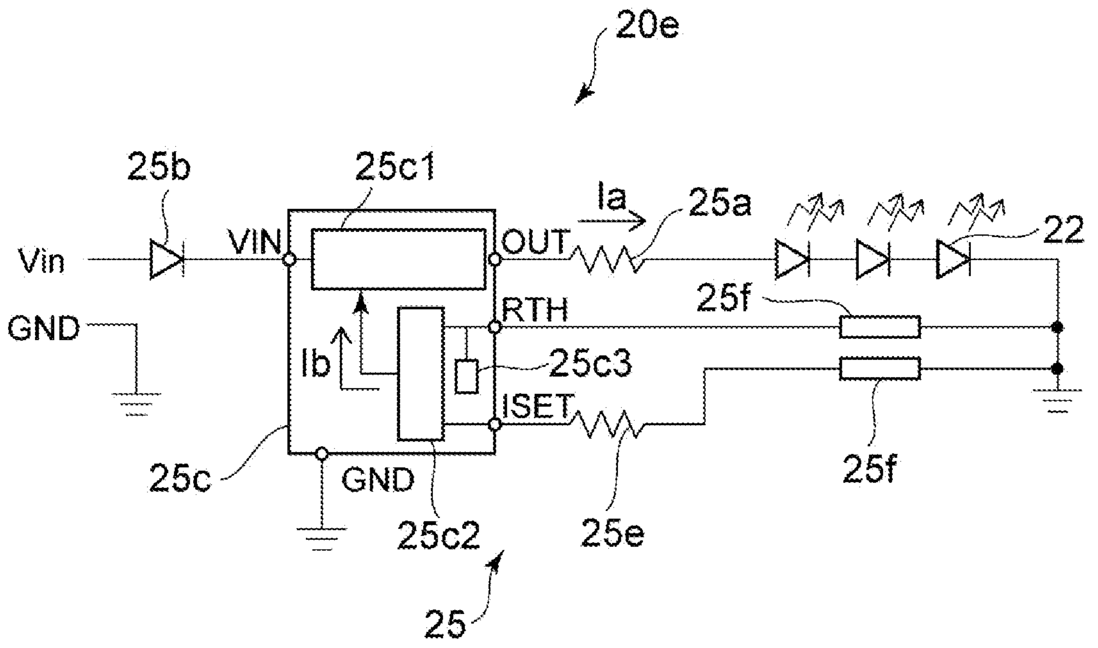
FIG. 13 is a circuit diagram for illustrating a light-emitting circuit according to another embodiment.

FIG. 13 is a circuit diagram for illustrating a light-emitting circuit 20*e* according to another embodiment.

As shown in FIG. 13, the light-emitting circuit 20*e* includes, for example, the light-emitting element 22, the resistor 25*a*, the protection element 25*b*, the control element 25*c*, the positive characteristic thermistors 25*f*, and the resistor 25*e*. That is, in the light-emitting circuit 20*e*, the negative characteristic thermistor 25*d* in the above-mentioned light-emitting circuit 20*a* is replaced with the positive characteristic thermistor 25*f*.

In such a case, for example, the resistor 25*e* and the positive characteristic thermistor 25*f* connected in series are electrically connected to the ISET terminal (corresponding to an example of a second circuit). The positive characteristic thermistor 25*f* is electrically connected to the RTH terminal (corresponding to an example of the first circuit).

In such a case, the current setting circuit 25*c*2, based on the resistance value of the positive characteristic thermistor 25*f* electrically connected to the RTH terminal, generates the setting current Ib that the current driver 25*cl* requires for setting the output current Ia flowing to the light-emitting element 22. Further, the current setting circuit 25*c*2 adjusts the setting current Ib based on the combined resistance value of the resistor 25*e* and the positive characteristic thermistor 25*f* electrically connected to the ISET terminal.

Here, the current setting circuit 25*c*2 of the light-emitting circuit 20*e* has a different operation setting from that of the current setting circuit 25*c*2 of the light-emitting circuit 20*a* described above.

If the resistance value of the positive characteristic thermistor 25*f* electrically connected to the RTH terminal increases, the current setting circuit 25*c*2 performs adjustment to decrease the output current Ia.

If the combined resistance value of the resistor 25*e* and the positive characteristic thermistor 25*f* electrically connected to the ISET terminal increases, the current setting circuit 25*c*2 performs adjustment to increase the ratio of decreasing the output current Ia.

Thus, as in the case of the light-emitting circuit 20*c* described above, the current setting circuit 25*c*2 may change the setting current Ib, and, by extension, the output current Ia, based on changes in the ambient temperature of the light-emitting element 22. Further, the setting current Ib may be adjusted in the same manner as in the case of the light-emitting circuit 20*a* described above.

As described above, even with the structure of the light-emitting circuit 20*e*, the same effects as the light-emitting circuit 20*a* described above can be obtained.

Figure 14:
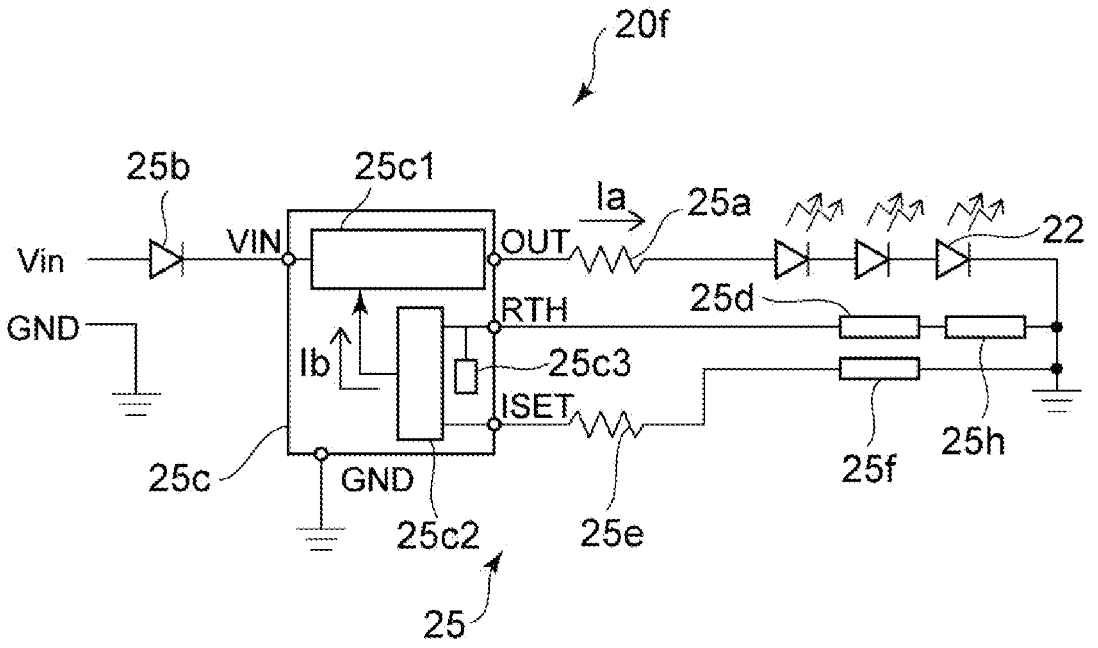
FIG. 14 is a circuit diagram for illustrating a light-emitting circuit according to another embodiment.

FIG. 14 is a circuit diagram for illustrating a light-emitting circuit 20*f* according to another embodiment.

As shown in FIG. 14, for example, the light-emitting circuit 20*f* includes the light-emitting element 22, the resistor 25*a*, the protection element 25*b*, the control element 25*c*, the negative characteristic thermistor 25*d*, the resistor 25*e*, the positive characteristic thermistor 25*f*, and a positive characteristic thermistor 25*h* (corresponding to an example of the first positive characteristic thermistor). That is, in the light-emitting circuit 20*f*, the connection positions of the positive characteristic thermistor 25*f* and the negative characteristic thermistor 25*d* in the above-mentioned light-emitting circuit 20*c* are switched, and further, the positive characteristic thermistor 25*h* is connected in series with the negative characteristic thermistor 25*d*.

In such a case, the positive characteristic thermistor 25*h* and the negative characteristic thermistor 25*d* connected in series are electrically connected to the RTH terminal (corresponding to an example of a first circuit). The resistor 25*e* and the positive characteristic thermistor 25*f* connected in series are electrically connected to the ISET terminal (corresponding to an example of a second circuit).

Here, the current setting circuit 25*c*2 of the light-emitting circuit 20*f* has the same operation setting as that of the current setting circuit 25*c*2 of the light-emitting circuit 20*a* or the current setting circuit 25*c*2 of the light-emitting circuit 20*c* described above.

If a combined resistance value of the positive characteristic thermistor 25*h* and the negative characteristic thermistor 25*d* electrically connected to the RTH terminal decreases, the current setting circuit 25*c*2 performs adjustment to decrease the output current Ia.

If the combined resistance value of the resistor 25*e* and the positive characteristic thermistor 25*f* electrically connected to the ISET terminal increases, the current setting circuit 25*c*2 performs adjustment to increase the ratio of decreasing the output current Ia.

Since a region where the ambient temperature of the light-emitting element 22 is low (for example, a region of 40° C. or less) is a region where the temperature of the positive characteristic thermistor 25*f* electrically connected to the ISET terminal is equal to or lower than the Curie temperature of the positive characteristic thermistor 25*f*, the combined resistance value of the resistor 25*e* and the positive characteristic thermistor 25*f* is substantially constant.

Thus, in a region where the ambient temperature of the light-emitting element 22 is low, the setting current Ib, and, by extension, the output current Ia, changes based on changes in the combined resistance value of the positive characteristic thermistor 25*h* and the negative characteristic thermistor 25*d*, electrically connected to the RTH terminal.

A Curie temperature of the positive characteristic thermistor 25*h* electrically connected to the RTH terminal and the Curie temperature of the negative characteristic thermistor 25*d* are adjusted such that in a region where the ambient temperature of the light-emitting element 22 is low (for example, in a region of 40° C. or lower), as the temperature rises, the combined resistance value of the positive characteristic thermistor 25*h* and the negative characteristic thermistor 25*d* increases, and when the temperature further rises (for example, in a region exceeding 40° C.), the combined resistance value of the positive characteristic thermistor 25*h* and the negative characteristic thermistor 25*d* begins to decrease.

In a region where the ambient temperature of the light-emitting element 22 is low (for example, a region of 40° C. or lower), if the combined resistance value of the positive characteristic thermistor 25*h* and the negative characteristic thermistor 25*d* electrically connected to the RTH terminal increases as the resistance value of the positive characteristic thermistor 25*h* increases, the output current Ia increases. Thus, as shown in FIG. 10, in a region where the ambient temperature of the light-emitting element 22 is low, as the ambient temperature of the light-emitting element 22 rises, the setting current Ib, and, by extension, the output current Ia, may be increased. That is, in a region where the ambient temperature of the light-emitting element 22 is low, a decrease in the total luminous flux due to a rise in the ambient temperature of the light-emitting element 22 may be offset by an increase in the total luminous flux due to an increase in the output current Ia. As a result, for example, as shown in FIG. 7, it is possible to suppress fluctuations in the total luminous flux in a region where the ambient temperature of the light-emitting element 22 is low.

Further, if the ambient temperature of the light-emitting element 22 rises and a ratio of decrease of the resistance value of the negative characteristic thermistor 25*d* becomes larger than a ratio of increase of the resistance value of the positive characteristic thermistor 25*h* (for example, in a region exceeding 40° C.), the combined resistance value of the positive characteristic thermistor 25*h* and the negative characteristic thermistor 25*d* electrically connected to the RTH terminal changes from increasing to decreasing, so the setting current Ib and, by extension, the output current Ia decrease.

Further, in a region where the temperature of the positive characteristic thermistor 25*f* electrically connected to the ISET terminal exceeds the Curie temperature of the positive characteristic thermistor 25*f* (for example, a temperature region where the ambient temperature of the light-emitting element 22 exceeds 60° C.), according to an increase in the resistance value of the positive characteristic thermistor 25*f* electrically connected to the ISET terminal, the setting current Ib is adjusted, and the ratio in which the output current Ia decreases increases. If the combined resistance value of the resistor 25*e* and the positive characteristic thermistor 25*f* electrically connected to the ISET terminal increases as the resistance value of the positive characteristic thermistor 25*f* increases, the output current Ia further decreases. As a result, as shown in FIG. 10, the ratio in which the output current Ia decreases may be increased.

That is, in a region where the ambient temperature of the light-emitting element 22 is high, the ratio of decreasing the total luminous flux may be changed.

As described above, even with the structure of the light-emitting circuit 20*f*, the same effects as the light-emitting circuit 20*c* described above can be obtained.

(Vehicle Lamp)

In one embodiment of the disclosure, the vehicle lamp 100 including the vehicle lighting device 1 may be provided. For the above-mentioned description of the vehicle lighting device 1 and modified examples of the vehicle lighting device 1 (for example, the light-emitting circuit 20*b*, or those having the features of the disclosure, where components are added, deleted, or the design is changed as appropriate by those skilled in the art), any of the above may be applied to the vehicle lamp 100.

Note that, in the following, a case where the vehicle lamp 100 is a front combination light provided in an automobile will be described as an example. However, the vehicle lamp 100 is not limited to a front combination light provided in an automobile. The vehicle lamp 100 may be any vehicle lamp installed in an automobile, a railway vehicle, or the like.

Figure 15:
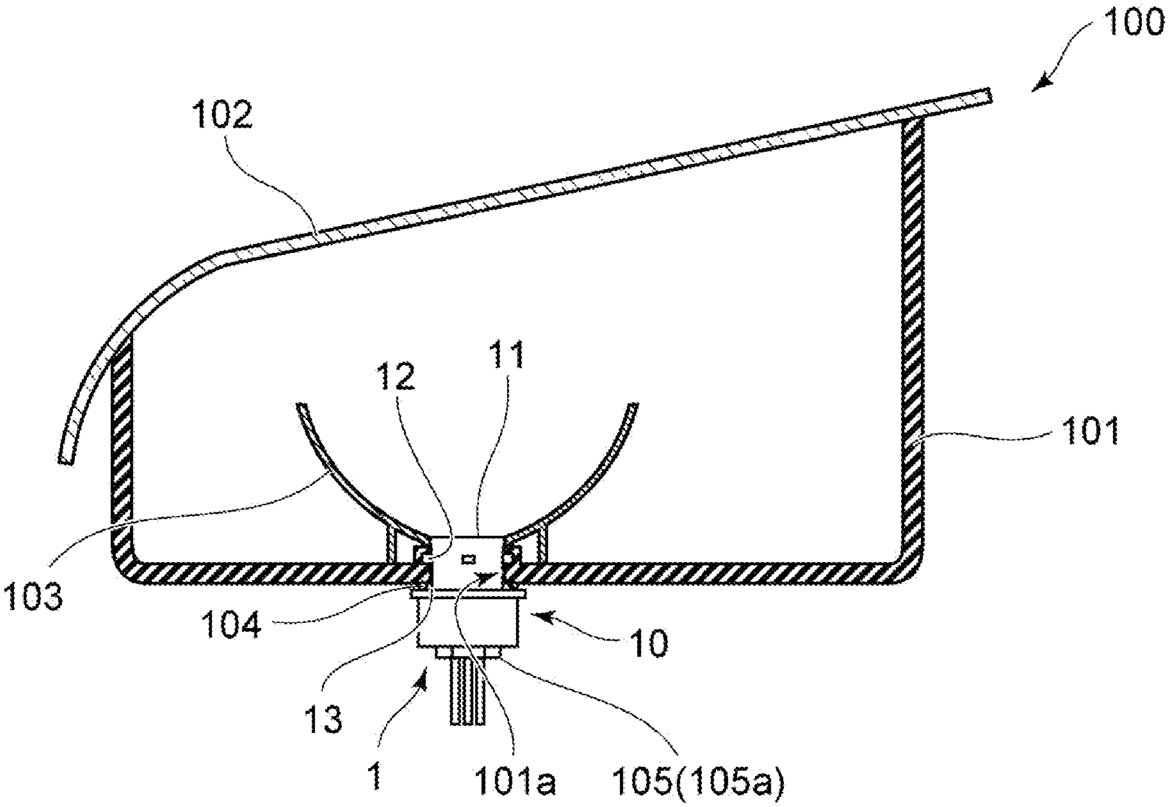
FIG. 15 is a schematic partial cross-sectional diagram for illustrating a vehicle lamp.

FIG. 15 is a schematic partial cross-sectional diagram for illustrating the vehicle lamp 100.

As shown in FIG. 15, the vehicle lamp 100 includes, for example, the vehicle lighting device 1, the housing 101, a cover 102, an optical element 103, a seal member 104, and the connector 105.

The vehicle lighting device 1 is attached to the housing 101. The housing 101 holds the attaching part 11. The housing 101 has a box shape with one end open. The housing 101 is made of, for example, resin that does not transmit light. A bottom surface of the housing 101 is provided with a mounting hole 101*a* into which a part of the attaching part 11 provided with the bayonet 12 is inserted. A recess into which the bayonet 12 provided on the attaching part 11 is inserted is provided at a periphery of the mounting hole 101*a*. Moreover, although the case in which the mounting hole 101*a* is directly provided in the housing 101 has been illustrated, a mounting member having the mounting hole 101*a* may be provided in the housing 101.

When attaching the vehicle lighting device 1 to the vehicle lamp 100, the part of the attaching part 11 provided with the bayonet 12 is inserted into the mounting hole 101*a*, and the vehicle lighting device 1 is rotated. Then, for example, the bayonet 12 is held in a fitting part provided at the periphery of the mounting hole 101*a*. This type of attachment method is called a twist lock.

The cover 102 is provided to close the opening of the housing 101. The cover 102 is made of translucent resin or the like. The cover 102 may also have a function such as a lens.

Light emitted from the vehicle lighting device 1 is incident on the optical element 103. The optical element 103 reflects, diffuses, guides, condenses, and forms a predetermined light distribution pattern for the light emitted from the vehicle lighting device 1. For example, the optical element 103 shown in FIG. 15 is a reflector. In such a case, the optical element 103 reflects the light emitted from the vehicle lighting device 1 to form a predetermined light distribution pattern.

The seal member 104 is provided between the flange 13 and the housing 101. The seal member 104 has an annular shape and is made of an elastic material such as rubber or silicone resin.

When the vehicle lighting device 1 is attached to the vehicle lamp 100, the seal member 104 is sandwiched between the flange 13 and the housing 101. Thus, the seal member 104 may seal an internal space of the housing 101. Further, the bayonet 12 is pressed against the housing 101 due to an elastic force of the seal member 104. Thus, it is possible to suppress the vehicle lighting device 1 from detaching from the housing 101.

The connector 105 is fitted to the ends of the multiple power feed terminals 31 exposed to the inside of the connector holder 15. A lighting circuit or the like is electrically connected to the connector 105. Thus, by fitting the connector 105 to the ends of the multiple power feed terminals 31, a lighting circuit or the like may be electrically connected to the light-emitting element 22.

Further, the connector 105 is provided with the seal member 105*a*. When the connector 105 having the seal member 105*a* is inserted into the connector holder 15, the inside of the connector holder 15 is sealed such that it is watertight.

Although several embodiments of the disclosure have been illustrated above, these embodiments are presented as examples and are not intended to limit the scope of the disclosure. These novel embodiments may be implemented in various other forms, and various omissions, substitutions, modifications, etc. may be made without departing from the gist of the disclosure. These embodiments and their modifications are included within the scope and gist of the disclosure, as well as within the scope of the disclosure described in the claims and its equivalents. Further, each of the embodiments described above may be implemented in combination with each other.

Supplementary notes regarding the above-described embodiments will be shown below.

(Supplementary Note 1)

A vehicle lighting device, including:

a socket;

a substrate provided on one end side of the socket;

a light-emitting element provided on the substrate;

a control element provided on the substrate and including a current driver whose output side is electrically connected to the light-emitting element and a current setting circuit whose output side is electrically connected to the current driver;

a first circuit provided on the substrate, electrically connected to a first input side of the current setting circuit, and whose resistance value changes depending on an ambient temperature of the light-emitting element; and a second circuit provided on the substrate, electrically connected to a second input side of the current setting circuit, and whose resistance value changes depending on the ambient temperature of the light-emitting element, wherein the current setting circuit:

in a temperature region where the ambient temperature of the light-emitting element exceeds a first temperature and is equal to or lower than a second temperature higher than the first temperature, decreases an output current flowing to the light-emitting element as the ambient temperature of the light-emitting element rises, based on changes in the resistance value of the first circuit, and in a temperature region where the ambient temperature of the light-emitting element exceeds the second temperature, increases a ratio of decreasing the output current flowing to the light-emitting element as the ambient temperature of the light-emitting element rises, based on changes in the resistance value of the second circuit.

(Supplementary Note 2)

The vehicle lighting device according to Supplementary note 1, wherein in a temperature region where the ambient temperature of the light-emitting element is lower than the first temperature, the current setting circuit increases the output current flowing to the light-emitting element as the ambient temperature of the light-emitting element rises, based on changes in the resistance value of the second circuit.

(Supplementary Note 3)

The vehicle lighting device according to Supplementary note 1 or 2, wherein in a temperature region where the ambient temperature of the light-emitting element is lower than the first temperature, the current setting circuit increases the output current flowing to the light-emitting element as the ambient temperature of the light-emitting element rises, based on changes in the resistance value of the first circuit.

(Supplementary Note 4)

The vehicle lighting device according to any one of the Supplementary notes 1 to 3, wherein the first circuit includes a first negative characteristic thermistor, a first positive characteristic thermistor, or the first negative characteristic thermistor and the first positive characteristic thermistor connected in series, and the second circuit includes a second negative characteristic thermistor, a second positive characteristic thermistor, or the second negative characteristic thermistor and the second positive characteristic thermistor connected in series.

(Supplementary Note 5)

The vehicle lighting device according to Supplementary note 4, wherein the current setting circuit generates a setting current that the current driver requires for setting the output current flowing to the light-emitting element based on a resistance value of the first negative characteristic thermistor, and adjusts the setting current based on a resistance value of the second positive characteristic thermistor.

(Supplementary Note 6)

The vehicle lighting device according to Supplementary note 5, wherein the current setting circuit generates the setting current in which the output current decreases if the resistance value of the first negative characteristic thermistor decreases, and adjusts the setting current to increase a ratio in which the output current decreases if the resistance value of the second positive characteristic thermistor increases.

(Supplementary Note 7)

The vehicle lighting device according to any one of Supplementary notes 4 to 6, wherein in a temperature region equal to or lower than a Curie temperature of the second positive characteristic thermistor, the current setting circuit generates the setting current that increases the output current based on a decrease in a resistance value of the second negative characteristic thermistor.

(Supplementary Note 8)

A vehicle lamp, comprising:

a vehicle lighting device according to any one of Supplementary notes 1 to 7, and a housing to which the vehicle lighting device is attached.

What is claimed is:

1. A vehicle lighting device, comprising:

a socket;

a substrate provided on one end side of the socket;

a light-emitting element provided on the substrate;

a control element provided on the substrate and comprising a current driver whose output side is electrically connected to the light-emitting element and a current setting circuit whose output side is electrically connected to the current driver;

a first circuit provided on the substrate, electrically connected to a first input side of the current setting circuit, and whose resistance value changes depending on an ambient temperature of the light-emitting element; and a second circuit provided on the substrate, electrically connected to a second input side of the current setting circuit, and whose resistance value changes depending on the ambient temperature of the light-emitting element, wherein the current setting circuit:

in a temperature region where the ambient temperature of the light-emitting element exceeds a first temperature and is equal to or lower than a second temperature higher than the first temperature, decreases an output current flowing to the light-emitting element as the ambient temperature of the light-emitting element rises, based on changes in the resistance value of the first circuit, and in a temperature region where the ambient temperature of the light-emitting element exceeds the second temperature, increases a ratio of decreasing the output current flowing to the light-emitting element as the ambient temperature of the light-emitting element rises, based on changes in the resistance value of the second circuit.

2. The vehicle lighting device according to claim 1, wherein in a temperature region where the ambient temperature of the light-emitting element is lower than the first temperature, the current setting circuit increases the output current flowing to the light-emitting element as the ambient temperature of the light-emitting element rises, based on changes in the resistance value of the second circuit.

3. The vehicle lighting device according to claim 1, wherein in a temperature region where the ambient temperature of the light-emitting element is lower than the first temperature, the current setting circuit increases the output current flowing to the light-emitting element as the ambient temperature of the light-emitting element rises, based on changes in the resistance value of the first circuit.

4. The vehicle lighting device according to claim 1, wherein the first circuit comprises a first negative characteristic thermistor, a first positive characteristic thermistor, or the first negative characteristic thermistor and the first positive characteristic thermistor connected in series, and the second circuit comprises a second negative characteristic thermistor, a second positive characteristic thermistor, or the second negative characteristic thermistor and the second positive characteristic thermistor connected in series.

5. The vehicle lighting device according to claim 4, wherein the current setting circuit generates a setting current that the current driver requires for setting the output current flowing to the light-emitting element based on a resistance value of the first negative characteristic thermistor, and adjusts the setting current based on a resistance value of the second positive characteristic thermistor.

6. The vehicle lighting device according to claim 5, wherein the current setting circuit generates the setting current in which the output current decreases if the resistance value of the first negative characteristic thermistor decreases, and adjusts the setting current to increase a ratio in which the output current decreases if the resistance value of the second positive characteristic thermistor increases.

7. The vehicle lighting device according to claim 4, wherein in a temperature region equal to or lower than a Curie temperature of the second positive characteristic thermistor, the current setting circuit generates the setting current that increases the output current based on a decrease in a resistance value of the second negative characteristic thermistor.

8. The vehicle lighting device according to claim 5, wherein in a temperature region equal to or lower than a Curie temperature of the second positive characteristic thermistor, the current setting circuit generates the setting current that increases the output current based on a decrease in a resistance value of the second negative characteristic thermistor.

9. The vehicle lighting device according to claim 6, wherein in a temperature region equal to or lower than a Curie temperature of the second positive characteristic thermistor, the current setting circuit generates the setting current that increases the output current based on a decrease in a resistance value of the second negative characteristic thermistor.

10. A vehicle lamp, comprising:
a vehicle lighting device according to claim 1; and
a housing to which the vehicle lighting device is attached.

* * * * *